(12) United States Patent
Schrader

(10) Patent No.: US 7,591,504 B1
(45) Date of Patent: Sep. 22, 2009

(54) PASSENGER DOOR RELOCATION SYSTEM AND METHOD

(75) Inventor: Michael Schrader, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/205,287

(22) Filed: Sep. 5, 2008

(51) Int. Cl. *B60J 5/06* (2006.01)

(52) U.S. Cl. ............... 296/202; 296/146.12; 296/155

(58) Field of Classification Search .......... 296/202, 296/146.1, 147, 148, 155, 146.4, 146.11, 296/146.12

See application file for complete search history.

(56) References Cited

U.S. PATENT DOCUMENTS

| | | | |
|---|---|---|---|
| 2,036,118 A | | 3/1936 | Carr |
| 3,594,036 A | | 7/1971 | Cadiou |
| 4,940,282 A | * | 7/1990 | Townsend ............... 296/204 |
| 4,976,488 A | | 12/1990 | Asai et al. |
| 5,013,082 A | * | 5/1991 | Landmesser ............. 296/202 |
| 5,524,960 A | * | 6/1996 | Townsend ............... 296/155 |
| 5,688,019 A | * | 11/1997 | Townsend ............... 296/155 |
| 5,918,926 A | | 7/1999 | Townsend |
| 6,145,919 A | | 11/2000 | Mysliwiec et al. |
| 6,276,751 B1 | * | 8/2001 | Ikarashi et al. ......... 296/190.11 |
| 6,742,829 B2 | * | 6/2004 | Reihl ..................... 296/108 |
| 6,808,223 B1 | * | 10/2004 | Baum et al. ............ 296/146.12 |
| 6,899,374 B1 | * | 5/2005 | Heard ..................... 296/155 |
| 7,007,346 B2 | * | 3/2006 | Hoffman ................. 16/367 |
| 7,134,709 B2 | * | 11/2006 | Valois ................... 296/146.11 |
| 7,438,346 B1 | * | 10/2008 | Breed ..................... 296/146.4 |
| 2007/0120395 A1 | * | 5/2007 | Geyrhofer et al. ...... 296/146.11 |
| 2007/0126260 A1 | * | 6/2007 | Geyrhofer et al. ...... 296/146.12 |

FOREIGN PATENT DOCUMENTS

| EP | 1151880 A1 | 11/2001 |
|---|---|---|
| EP | 1151880 B1 | 9/2006 |

\* cited by examiner

*Primary Examiner*—Glenn Dayoan
*Assistant Examiner*—Gregory Blankenship
(74) *Attorney, Agent, or Firm*—Mark E. Duell, Esq.; Emerson, Thomson & Bennett

(57) ABSTRACT

A system and method for transferring and storing a vehicle's passenger doors is disclosed. The passenger door may be adjusted from a closed condition, preventing a passenger from accessing the interior of the vehicle, to a stored condition where the passenger door is stored within the vehicle's storage compartment. The passenger door remains supported to the vehicle throughout the process.

19 Claims, 7 Drawing Sheets

PASSENGER DOOR RELOCATION SYSTEM AND METHOD

I. BACKGROUND OF THE INVENTION

A. Field of Invention

This invention pertains to the art of methods and apparatuses relating to vehicle passenger doors and more particularly to methods and apparatuses regarding the opening and storage of a vehicle passenger door to simulate a motorcycle feel.

B. Description of the Related Art

Motorcycles are well known vehicles that many people enjoy riding. One aspect of enjoyment is the "open-air" feeling the rider gets while riding the motorcycle. While many motorcycles work well for their intended purpose, they have disadvantages. One disadvantage is the lack of protection from weather conditions. Another disadvantage, for some people, is the lack of stability that such a two-wheeled vehicle provides when compared to a four wheeled vehicle, such as an automobile.

Vehicles having three or more wheels are also well known and they too generally work well for their intended purpose. The use of three or more ground engaging wheels provides the stability that some people desire. Such vehicles generally have a passenger compartment with passenger doors by which persons may enter and leave the passenger compartment. The use of a passenger compartment provides protection from weather conditions. One disadvantage, however, of passenger compartments and passenger doors is that they do not provide the open-air feeling that some people enjoy.

In an effort to provide the open-air feeling to a vehicle having a passenger compartment, it is known to provide manually removable passenger doors. The passenger door removal and reattachment processes, however, are tedious and time consuming. Additionally, storage of the passenger doors after they have been removed from the vehicle is also a problem. One option is to store such a passenger door in the vehicle's trunk or storage compartment. This option, however, may not be an option if the passenger door or doors do not fit within the vehicle storage compartment. Even if they do, it is difficult and time consuming to move the passenger doors between the normal operating condition and the vehicle storage compartment. Another option is to store such a passenger door outdoors. This option, however, has the disadvantages of subjecting the passenger door to the weather, vandalism, and theft. It is also possible that such disassembled passenger doors may be considered an eye sore. Yet another option is to store such a passenger door in some other storage facility, such as a garage. This option, however, has the disadvantage of taking up the storage facility space which otherwise could be used for other purposes. This option also has the disadvantage, if the passenger has taken the vehicle away from the storage facility, of leaving the passenger exposed to the elements during inclement weather while riding in the vehicle.

Therefore, what is needed is a passenger door that can be: (1) used as a typical passenger door in providing access to the passenger compartment; and (2) easily adjusted to a stored condition on the vehicle whereby the vehicle can easily achieve the open-air feeling without the storage problems noted above.

II. SUMMARY OF THE INVENTION

According to one aspect of the embodiment, a new method for easily and safely relocating a vehicles' door is provided that comprises: (1) a vehicle frame, (2) a locomotion source that is operatively supported to the vehicle frame and that provides locomotion for the vehicle, (3) at least one ground engaging wheel supported to the vehicle frame, (4) a passenger compartment supported to the vehicle frame, (5) a first passenger seat positioned within the passenger compartment, (6) a first passenger door movably supported to the vehicle frame and, (7) a storage compartment supported to the vehicle frame; (B) adjusting the first passenger door into a first closed condition where the first passenger door is positioned to prevent an associated passenger from having access to the first passenger seat from outside the vehicle; (C) adjusting the first passenger door from the first closed condition to a second stored condition where the first passenger door is positioned (1) at least partially within the storage compartment and, (2) to provide the associated passenger access to the first passenger seat from outside the vehicle; and wherein the first passenger door remains supported to the vehicle throughout step (C).

According to another embodiment, a method comprises (A) providing a vehicle having (1) a vehicle frame, (2) a locomotion source that is operatively supported to the vehicle frame and that provides locomotion for the vehicle, (3) at least one ground engaging wheel supported to the vehicle frame, (4) a passenger compartment supported to the vehicle frame, (5) a first passenger seat positioned within the passenger compartment, (6) a first passenger door movably supported to the vehicle frame, and, (7) a storage compartment supported to the vehicle frame; (B) adjusting the first passenger door into a first closed condition where the first passenger door is positioned to prevent an associated passenger from having access to the first passenger seat from outside the vehicle; and (C) adjusting the first passenger door from the first closed condition to a second stored condition where the first passenger door is positioned (1) at least partially within the storage compartment, and, (2) to provide the associated passenger access to the first passenger seat from outside the vehicle and, wherein the first passenger door remains supported to the vehicle throughout step (C).

One advantage of this invention is that the open-air feeling can be easily simulated on a vehicle having a passenger compartment with one or more passenger doors.

Another advantage of this invention is that the vehicle passenger no longer needs to spend a great amount of time removing the doors from their vehicle. The passenger can press a button in the vehicle's interior and have the doors automatically be stowed away.

Another advantage of this invention is that the storing of the exterior doors is no longer an issue. The doors are detached and are moved into the storage compartment space. This eliminates the risk of being exposed to inclement weather or being stolen because the doors are not stored with the vehicle.

Yet another advantage of this invention is that there is no longer any chance of the removed doors being damaged during removal. The invention is an entirely automated process that involves no human intervention in order to complete (beyond pressing a button). Therefore, there is no chance of human error that would damage the doors, and that any additional chance of damage is greatly reduced.

Yet another advantage of this invention is the ability to park the vehicle closer to other parked vehicles and therefore fit a greater number of automobiles into a limited space. It is common knowledge that in order for an passenger to exit the vehicle, the door must be opened to a rather large angle. This requires a certain amount of space between the vehicle in question and the vehicle parked beside the passenger exiting the vehicle. This invention does not require the space for opening the exterior door. The door rotates upwards and requires a small amount of space to reach the point of rotation. Thus, it greatly reduces the need for space between two parked vehicles.

Yet another advantage of this invention and related to the above advantage, because the door rotates upwards, the common occurrence of accidentally contacting a vehicle parked adjacent with the exterior door would be eliminated.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
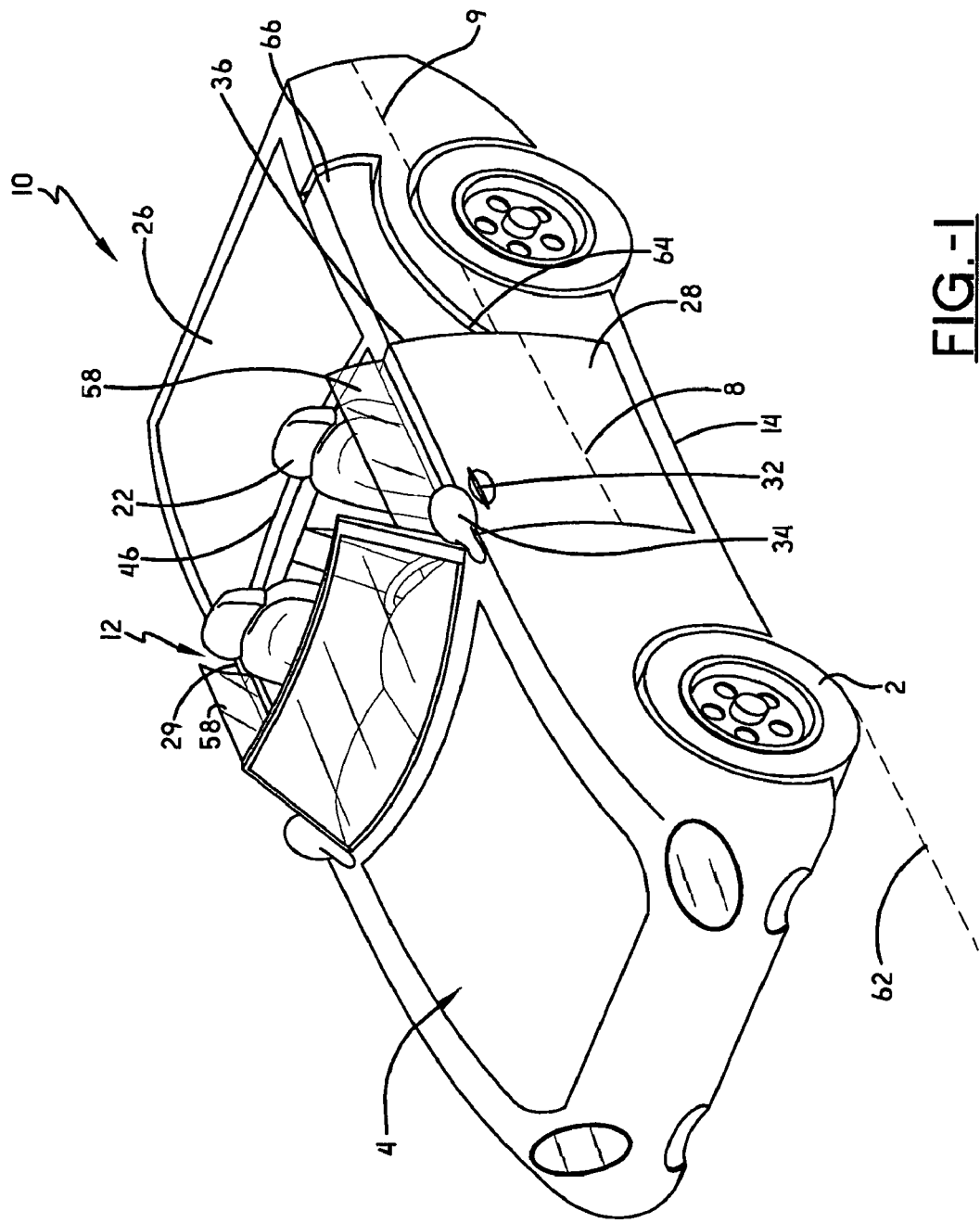
FIG. 1 is a perspective side view of a vehicle that may use an adjustable passenger door according to one embodiment of this invention.

Referring now to the drawings wherein the showings are for purposes of illustrating embodiments of the invention only and not for purposes of limiting the same, FIGS. 1-5 show a vehicle 10 that may include one or more adjustable passenger doors according to this invention. While the vehicle shown is the type of automobile commonly referred to as a convertible, where the roof can be easily moved between a use condition (where it provides overhead protection for the passenger) and a storage condition, it should be understood that this invention will work with any vehicle including, for some non-limiting examples, any modern mode of transportation or vehicle, including non-convertible automobiles, trucks, aircraft or sea-faring vessels. It should also be noted that while the removal of a roof from the passenger compartment, such as occurs with a convertible, provides a portion of the open-air feeling for the passenger(s), the adjustable passenger doors of this invention will also work with other vehicle roof styles, including for some non-limiting examples, a standard or fixed roof and a roof that is a rigid structure but is still removable from the vehicle. The vehicle 10 may include a frame 14, one or more ground engaging wheels 2 mounted to the frame 14, and a locomotion source 4, mounted to the frame 14, for use in providing locomotion for the vehicle 10. The locomotion source could be of any type chosen with the sound judgment of a person of skill in the art including, for some non-limiting examples, an internal combustion engine (ICE), an electric motor, and so called "hybrids" which combine an ICE with an electric motor. The vehicle 10 may also include a passenger compartment 12, supported to the frame 14, for use in housing one or more passengers as is well known in the art. One or more passenger seats 22 may be positioned within the passenger compartment 12 and one or more passenger doors 28 may be used to provide and restrict access to the passenger compartment 12.

Figure 2:
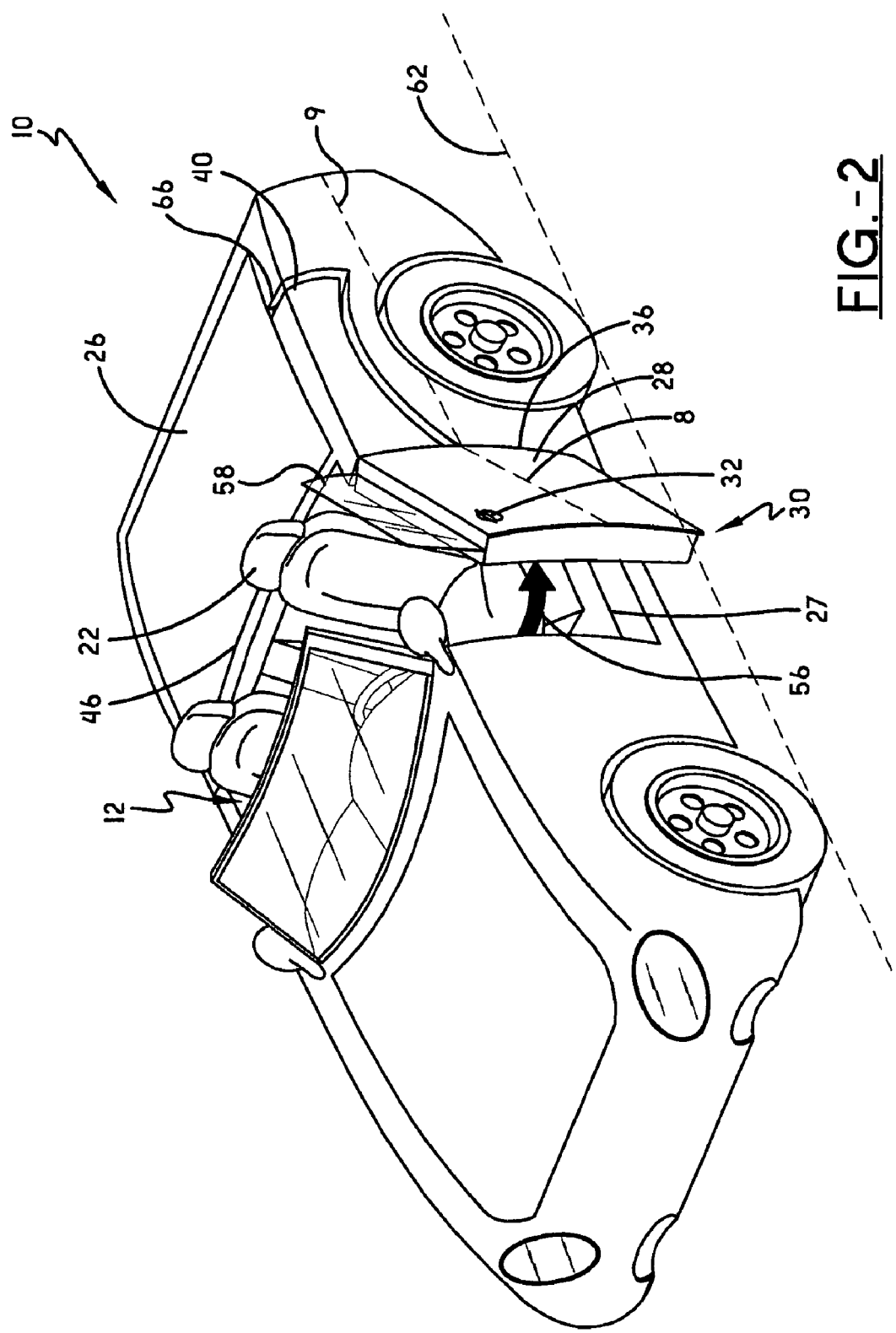
FIG. 2 is a perspective side view of the vehicle shown in FIG. 2 but showing the passenger door in a substantially open condition.
Figure 3:
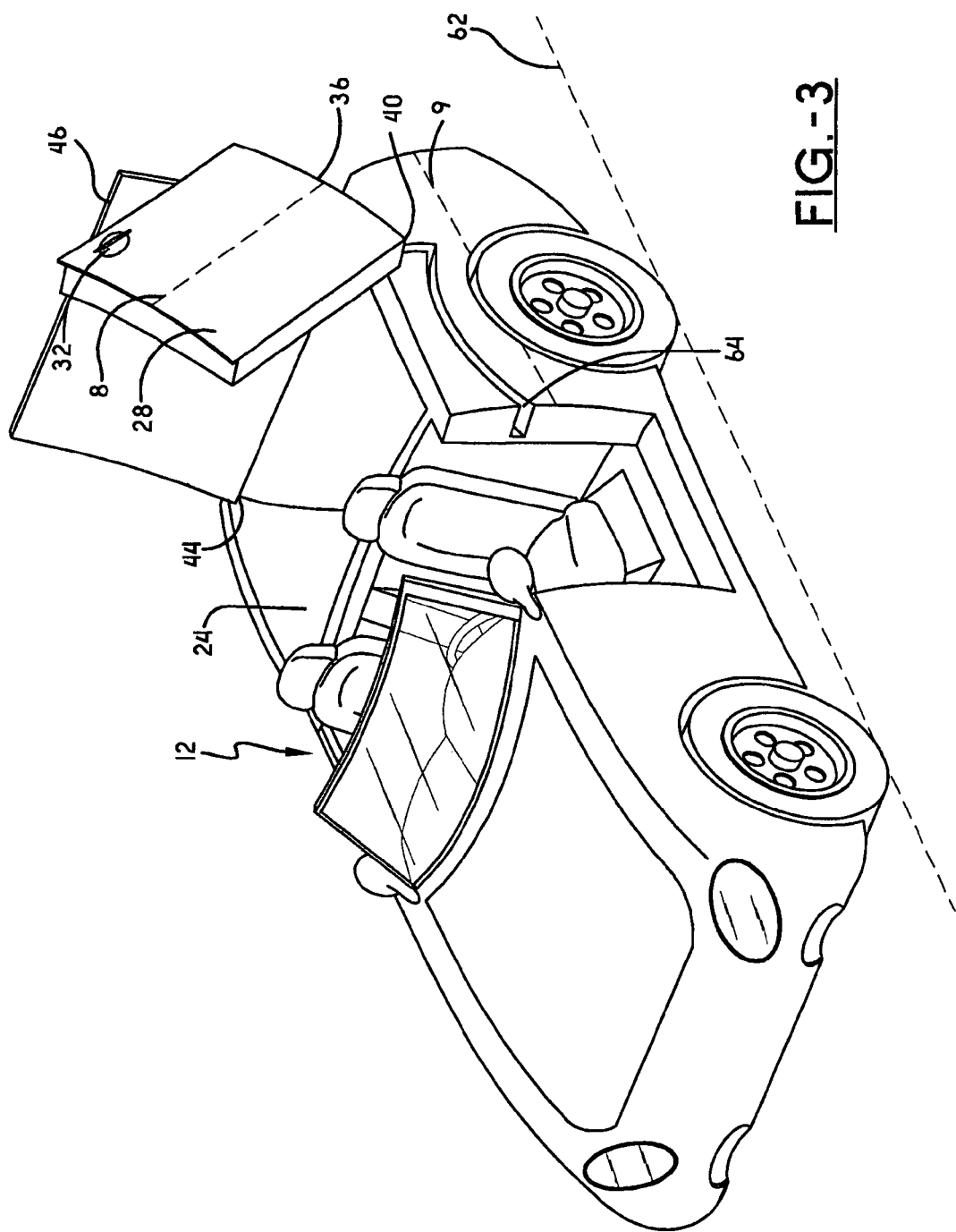
FIG. 3 is a perspective side view of the vehicle shown in FIG. 2 but showing the passenger door in a position between the closed condition and the stored condition.
Figure 4:
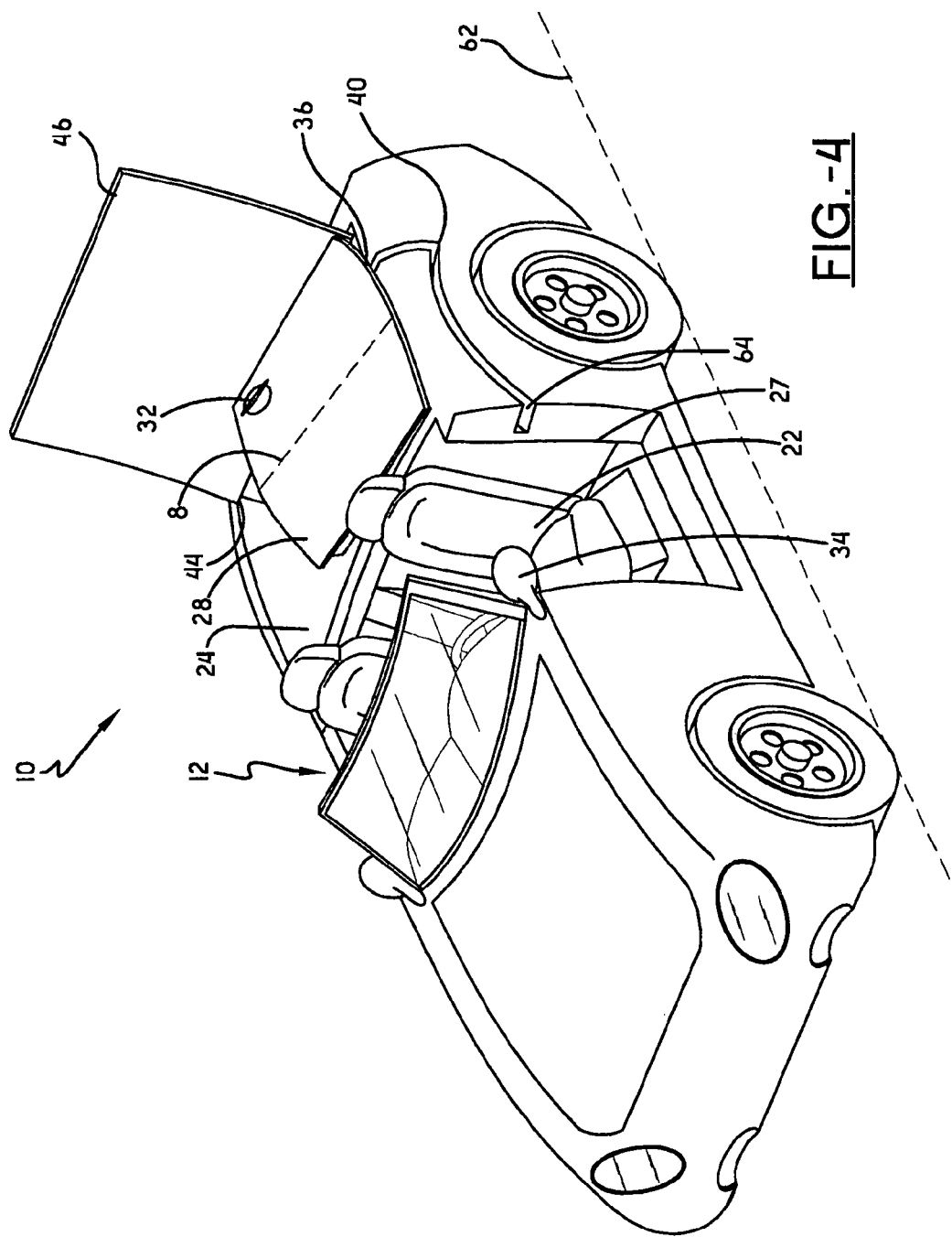
FIG. 4 is a perspective side view of the vehicle shown in FIG. 2 but showing the passenger door in another position between the closed condition and the stored condition.
Figure 5:
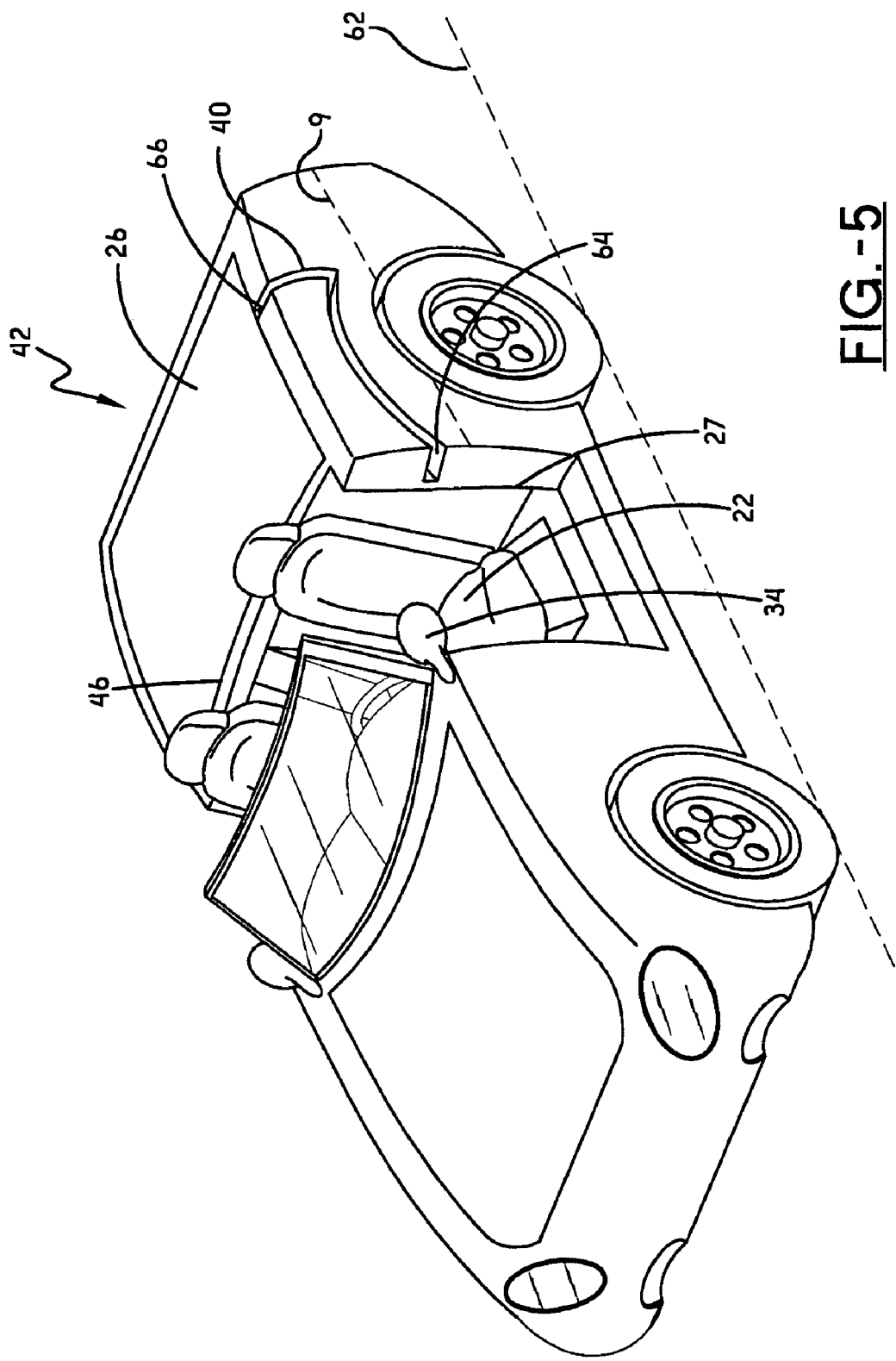
FIG. 5 is a perspective side view of the vehicle shown in FIG. 2 but showing the passenger door in the stored condition.

With continuing reference to FIGS. 1-5, the vehicle 10 may also include at least one storage compartment 24 which is also supported to the frame 14. The storage compartment 24 may be enclosed and protected by a storage compartment lid 26, as shown. In one embodiment, the storage compartment lid 26 may be designed to permit access to the storage compartment 24 by opening via a pivot point at the trailing edge 44 of the vehicle 10. A hinge may be used, but is used merely for illustrative purposes, and should not be viewed as limiting. In this way, the rear-most portion or trailing edge 44 of the storage compartment lid 26 remains substantially attached to the vehicle 10 and pivotable at the trailing edge 44, as shown in FIGS. 4 and 5. The leading edge 46, or the portion of the storage compartment lid 26 that is closest to the passenger compartment 16, may be designed to lack any permanent attaching means to the vehicle 10, as it is the portion which opens to permit access to the storage compartment 24. Additionally, alternative methods may be used for opening the storage compartment lid 26 using ordinary skill in the art, such as mechanical actuators or a torsion spring system. It should also be noted that while the storage compartment 24 shown is positioned in the rearward end of the vehicle 10, the storage compartment 24 may be positioned in any location chosen with the sound engineering judgment of a person of skill in the art.

With continuing reference to FIGS. 1-5, according to one embodiment of this invention at least one of the passenger doors 28 may be adjusted between: (A) a first closed condition, shown in FIG. 1, where the passenger door 28 is positioned to prevent passengers from having access to the passenger compartment from outside the vehicle 10; and, (B) a second stored condition, shown in FIG. 5. In one specific embodiment shown in FIG. 5, when in the second stored condition the passenger door 28 may be positioned: (A) at least partially within the storage compartment 24; and, (B) to provide passenger access to the passenger compartment 12 from outside the vehicle 10.

With reference now to FIGS. 1 and 2, though not required for this invention in one embodiment, the passenger door 28 may also be positioned into a substantially open condition 56, shown in FIG. 2. In most modern vehicles, passenger doors 28 open at the leading edge of a door threshold 27, allowing the passenger to step outside of the passenger compartment and then back towards the rear of the vehicle 10. In this embodiment, the hinges 54 are at the trailing edge 36 of the door threshold 27, where the trailing edge 36 is defined as having the passenger door hinged on the edge closer to the rear of the vehicle 10. This permits the passenger to step outside of the vehicle 10 and then forward toward the front of the vehicle 10. This rear-hinged door has many names in the automotive industry, including "suicide doors", "coach doors" or "freestyle doors." It should be noted, however, that this invention is not limited to rear-hinged passenger doors.

With reference now to FIGS. 1-5, in one embodiment, though not required for this invention, the passenger door 28 may have a handle 32. In one embodiment the handle 32 serves the purpose, when maneuvered, of unlatching one end of the passenger door 28 from the vehicle 10 so that the passenger can adjust the door from the closed condition, shown in FIG. 1, to the open condition, shown in FIG. 2. In this way the passenger can easily acquire access to the vehicle 10. In another embodiment, the handle 32 may be used to adjust the position of the passenger door 28 from the open condition 30, shown in FIG. 2, to the stored condition 42, shown in FIG. 5. The handle 32 may be positioned, in one embodiment, near the front of the passenger door 28 close to the side rearview mirror 34. In another embodiment, the handle 32 may be located on the upper most portion of the passenger door 28, in close proximity to the side rear view mirror 34 and passenger window 58, as shown in FIG. 2. In another embodiment, in place of a handle 32 there may be a recess or cavity for a passenger to grab onto and transfer the passenger door 28 into the various conditions. The specific location of the door handle 32, if used, can be any chosen with the sound judgment of a person of skill in the art.

With reference now to FIGS. 1-6, it should be noted that the passenger door 28 can be attached to the vehicle 10 during its motion between the closed and stored conditions in any manner chosen with the sound judgment of a person of skill in the art. In one embodiment, a track/track receptor interconnection 68 may be used for this purpose. The expression "track/track receptor interconnection" means a connection between at least two components where at least one of the components has at least one track receptor and at least another component has at least one track or channel that receives the track receptor; the track/track receptor interconnection permits the two components to move relative to each other as the track receptor moves relatively with respect to and within the track. In one embodiment, shown, the track receptor 38 is attached to the passenger door 28 and the track or channel 40 is attached to the vehicle 10. In another embodiment, the track receptor 38 is attached to the vehicle 10 and the track or channel 40 is attached to the passenger door 28.

With continuing reference to FIGS. 1-6, for the embodiment shown, the track 40 may be located on the exterior of the vehicle 10 and may have a first end 64 in the door threshold 27 and a second end 66 in or near the storage compartment 24. The track 40 may be integrated into the exterior side of the body panels of the vehicle 10. The exterior mounting of the track 40 and track receptor 38 allows the passenger door 28 some movement and to be continuously mounted to vehicle 10. When operated by the passenger, the passenger door 28 and track receptor 38 will follow the track 40 until reaching the storage compartment 24.

Figure 6:
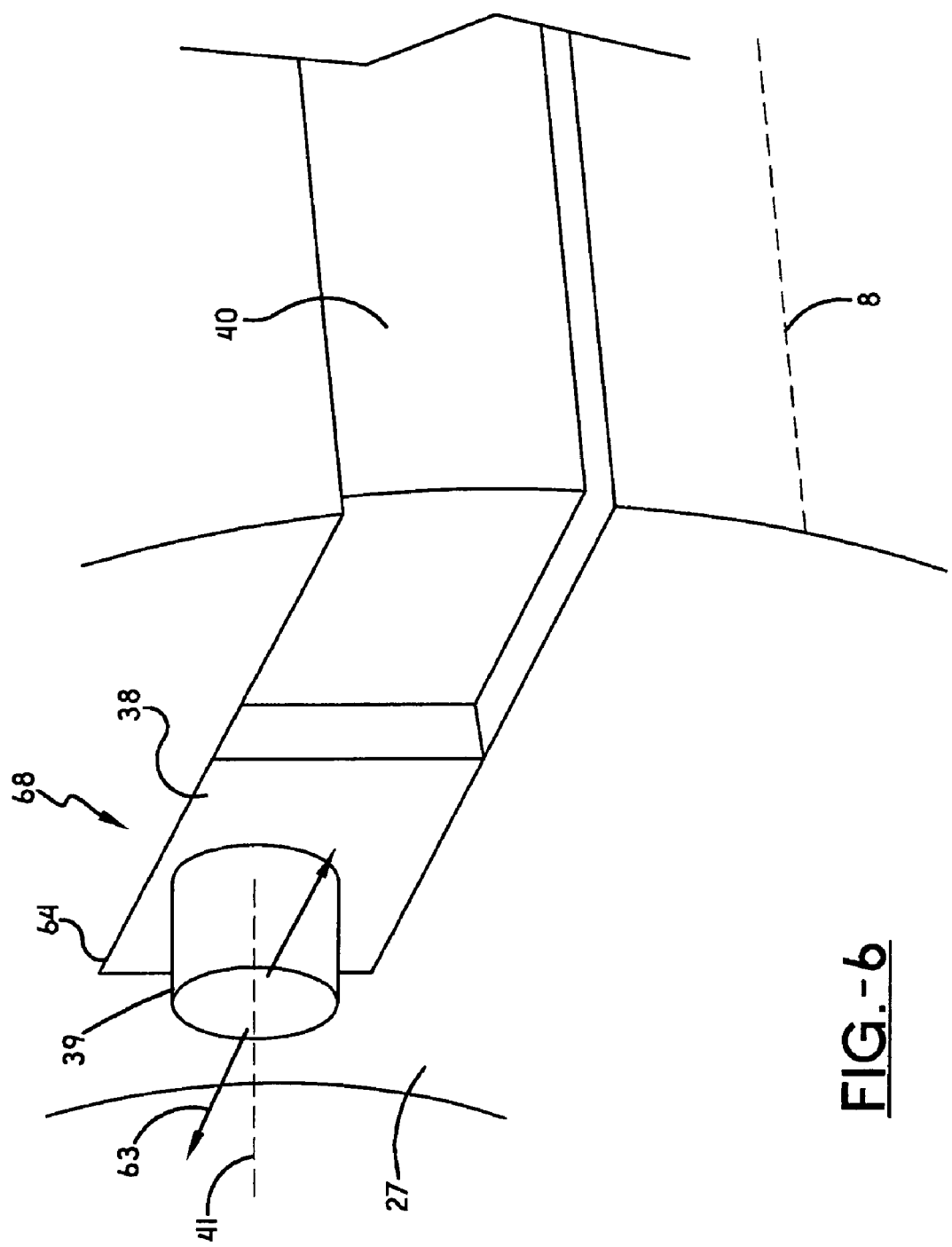
FIG. 6 is a perspective view of the track and track receptor that may be used to move the passenger door according to one embodiment of this invention.

With reference now to FIG. 6, the track 40 and track receptor 38 are shown in accordance with one embodiment of this invention. The passenger door 28 has been removed for simplified viewing of the track receptor 38. The track receptor 38 is shown in the first closed condition 30. In one embodiment, the track receptor 38 is slidably attached to the track 40. In another embodiment, the track receptor 38 may move along track 40 via mechanical actuators that are under the vehicle 10 body. In one embodiment, springs and mechanical actuators may be used to support and move the passenger doors. In another embodiment, the track receptor 38 may be propelled down the track 40 via hydraulic or pneumatic actuators. In another embodiment, the passenger door 28 and track receptor 38 may be manually moved by the passenger. While a single track receptor 38 is shown, it should be noted that in alternate embodiments, two or more track receptors may be used with one passenger door 28.

With reference now to FIGS. 1-6, in another embodiment, the track receptor 38 may have a rotating hinge 39 that rotates about an axis 41. The rotating hinge 39 rotates the passenger door 28 in a direction that is perpendicular to the rotation axis 41. As discussed below, the passenger door 28 transition between the closed condition 30 and the storage condition 42 may require the passenger door 28 to turn on the rotating hinge 39. The rotation of the passenger door 28 may be necessary so that space within the storage compartment 24 may be used more efficiently. Efficient storage of the passenger door 28 would allow for a second passenger door 29 to be stored within the storage compartment 24. In another embodiment, the rotating hinge 39 may also pivot on an axis 64 that is parallel to the ground surface 62. This motion permits the passenger door 28 to reach a substantially open condition 52 as shown in FIG. 2, which allows the passenger to enter and exit the vehicle 10.

Figure 7:
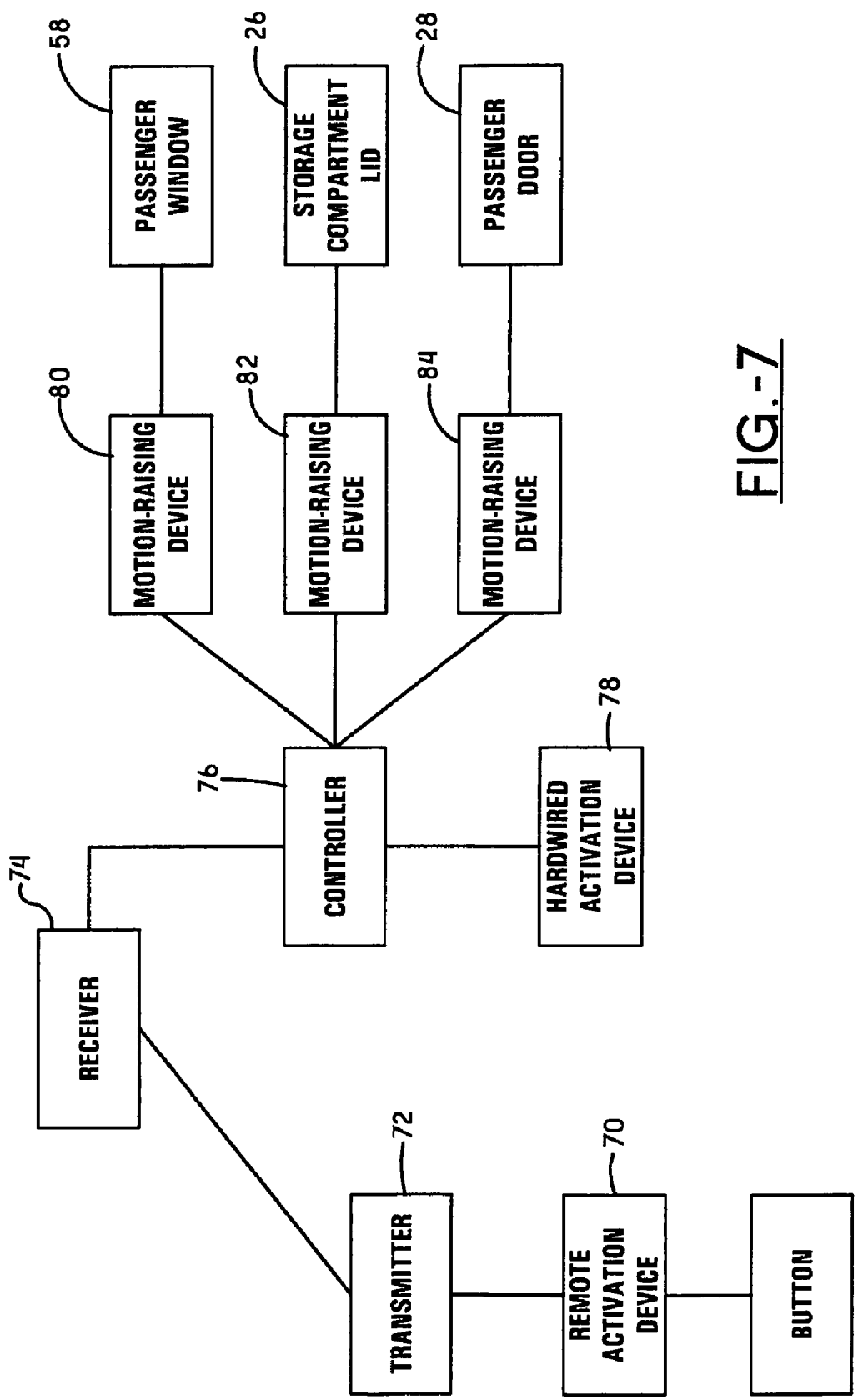
FIG. 7 is a schematic view of an automated control system that may be used to move the passenger door according to one embodiment of this invention.

With reference now to FIG. 1, to assist with understanding the motion of the passenger door 28, it should be noted that the passenger door 28 has a longitudinal axis 8 that is substantially parallel to the longitudinal axis 9 of the vehicle 10 when the passenger door 28 is in the first closed condition. Both axes 9, 10 are also substantially parallel to a ground surface 62 upon which the vehicle 10 is supported, as shown. It should also be noted that in one embodiment the motion of the passenger door 28 may be automated and only require the passenger to activate the process by pressing a button 86, or the like, in the vehicle 10 or on a remote activation device 70 so that the passenger may activate the process from beyond the confines of the vehicle 10, as shown in FIG. 7. FIG. 7 illustrates a control scheme for the automated passenger door embodiment according to one embodiment. Specifically, either a remote activation device or a hardwired activation device 78 may begin the process. In the remote embodiment, once the corresponding button 86 is pressed, a transmitter 72 relays the signal to the receiver 74 of the controller 76. In the hardwired activation device, which may be a push-button or a selection on the vehicle's 10 dash-mounted screen, relays a signal to the controller 76. Once the signal to begin the process is received by the controller 76, motion causing devices 80, 82, and 84 for the passenger windows 58, storage compartment lid 26, and passenger door 28, respectively, operate their corresponding apparatus and complete the process.

In another embodiment, the motion-causing devices may be, as non limiting examples, electric motors that may be powered by regenerative braking systems, hydraulic systems, or mechanical actuators. In another embodiment, the process may be manually operated, and may need the force from the passenger to relocate the passenger door 28 from the closed condition 30 to the stored condition 42, or vice versa.

With reference now to all the FIGURES, the adjustment of the passenger door 28 from the first closed condition 30 to the storage condition 42 will now be described. Once the selection is made to begin the relocation of the passenger door 28, the passenger door 28 having a longitudinal axis 8 may transition into where the longitudinal axis 8 of the passenger door 28 may be substantially perpendicular to the longitudinal axis 9 of the vehicle 10 and substantially perpendicular to the ground surface as shown in FIG. 3. In another embodiment, prior to the passenger door 28 becoming substantially perpendicular to the longitudinal axis 9 of the vehicle 10, the passenger door 28 may rotate to the substantially open condition 56, as shown in FIG. 2.

With continued reference to FIGS. 1-5, while the passenger door assembly 28 and passenger door track receptor 38 is perpendicular to a longitudinal axis 9 of the vehicle 10 and substantially perpendicular to the ground surface, as shown in FIG. 4, the passenger door 28 may rotate about 180° about the axis 41 on the rotating hinge 39, with the interior part of the passenger door assembly 28 facing away from the vehicle 10. Once the rotation of the passenger door assembly 28 and passenger door track receptor 38 is complete, the storage compartment lid 26 opens to an angle that is suitable for accepting the passenger door 28 and track receptor 38. Thus, after the longitudinal axis 8 of the passenger door 28 is substantially perpendicular to the longitudinal axis 9 of the vehicle 10 and substantially perpendicular to the ground surface 62, and after the storage compartment lid 26 opens to a suitable angle, the passenger door 28 and track receptor 38 will come to rest inside the storage compartment 24. This is motion is described as where the longitudinal axis 8 of the passenger door 28 is substantially perpendicular to the longitudinal axis 9 of the vehicle 10 and substantially parallel to the ground surface 62, as shown in FIG. 5. After the passenger door 28 and track receptor 38 has come to rest inside the storage compartment 24, the storage compartment lid 26 rotates and then closes the passenger door assembly 28 and passenger door track receptor 38 within the storage compartment 24, as shown in FIG. 6. This process may be done in reverse order when it is desired that the passenger door 28 be put back into its first closed condition 30.

In another embodiment, the passenger door 28 may be moved from the closed condition 30 to the stored condition 42 by moving the track 40 along the track receptor 38. In another embodiment, the operation of the second passenger door 29 is identical to the first passenger door 28, the only difference being that the second passenger door's 29 operation takes place on the opposing side from first passenger door 28 of the vehicle 10.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A method comprising the steps of:
   (A) providing a vehicle comprising: (1) a vehicle frame; (2) a locomotion source that is operatively supported to the vehicle frame and that provides locomotion for the vehicle; (3) at least one ground engaging wheel supported to the vehicle frame; (4) a passenger compartment supported to the vehicle frame; (5) a first passenger door movably supported to the vehicle frame; and, (6) a storage compartment supported to the vehicle frame;
   (B) adjusting the first passenger door into a first closed condition where the first passenger door is positioned to prevent a person from having access to the passenger compartment from outside the vehicle;
   wherein step (B) comprises the step of adjusting the first passenger door into a first closed condition where the first passenger door has a longitudinal axis that is: (1) substantially parallel to a longitudinal axis of the vehicle; and, (2) substantially parallel to a ground surface;
   (C) adjusting the first passenger door from the first closed condition to a second stored condition where the first passenger door is positioned: (1) at least partially within the storage compartment; and (2) to provide a person access to the passenger compartment from outside the vehicle;
   wherein step (C) comprises the steps of:
   adjusting the first passenger door into a position where the longitudinal axis of the first door is: (1) substantially perpendicular to the longitudinal axis of the vehicle; and (2) substantially perpendicular to the ground surface; and,
   adjusting the first passenger door into a position where the longitudinal axis of the first door is: (1) substantially perpendicular to the longitudinal axis of the vehicle; and (2) substantially parallel to the ground surface; and,
   wherein the first passenger door remains supported to the vehicle throughout step (C).

2. The method of claim 1 wherein step (C) comprises the steps of:
   relocating the first passenger door from the first closed condition to the second stored condition by an automated control system.

3. The method of claim 1 wherein step (C) comprises the steps of:
   relocating the passenger door is relocated from the first closed condition to the second stored condition using force provided by a passenger.

4. The method of claim 1 further comprising the step of:
   (D) adjusting the first passenger door with respect to the vehicle frame within a track/track receptor interconnection.

5. The method of claim 1 wherein proceeding adjusting the first passenger door from the first closed condition comprises the steps of:
   pivoting the first passenger door to a substantially open position.

6. The method of claim 4 wherein step (D) comprises the steps of:
   positioning at least one track receptor attached to the first passenger door within a track attached to the vehicle frame; and,
   moving the track receptor along the track.

7. The method of claim 4 wherein step (D) comprises the steps of:
   positioning at least one track receptor attached to the vehicle frame within a track attached to the first passenger door; and,
   moving the track along the track receptor.

8. The method of claim 1 wherein step (A) comprises the steps of:
   providing the storage compartment longitudinally rearward of the passenger compartment.

9. The method of claim 1 wherein step (A) comprises the steps of: providing the first passenger door on a first side of the passenger compartment; and, providing a second passenger door movably supported to the vehicle frame on a second side of the passenger compartment; the method further comprising the steps of:
   (D) adjusting the second passenger door into a first closed condition where the second passenger door is positioned to prevent a person from having access to the passenger compartment from outside the vehicle;
   (E) adjusting the second passenger door from the first closed condition to a second stored condition where the second passenger door is positioned: (1) at least partially within the storage compartment; and, (2) to provide a person access to the passenger compartment from outside the vehicle; and,
   wherein the second passenger door remains supported to the vehicle throughout step (E).

10. A method comprising the steps of:
(A) providing a vehicle comprising: (1) a vehicle frame; (2) a locomotion source that is operatively supported to the vehicle frame and that provides locomotion for the vehicle; (3) at least one ground engaging wheel supported to the vehicle frame; (4) a passenger compartment supported to the vehicle frame; (5) a first passenger door movably supported to the vehicle frame; and, (6) a storage compartment supported to the vehicle frame;
(B) adjusting the first passenger door into a first closed condition where the first passenger door is positioned to prevent a person from having access to the passenger compartment from outside the vehicle;
(C) adjusting the first passenger door from the first closed condition to a second stored condition where the first passenger door is positioned: (1) at least partially within the storage compartment; and, (2) to provide a person access to the passenger compartment from outside the vehicle;
wherein step (C) comprises the step of rotating the first passenger door about 90° when the longitudinal axis of the first door is: (1) substantially perpendicular to the longitudinal axis of the vehicle; and (2) substantially perpendicular to the ground surface; and,
wherein the first passenger door remains supported to the vehicle throughout step (C).

11. A vehicle comprising:
a vehicle frame;
a locomotion source that is operatively supported to the vehicle frame and that provides locomotion for the vehicle;
at least one ground engaging wheel supported to the vehicle frame;
a passenger compartment supported to the vehicle frame;
a storage compartment supported to the vehicle frame; and,
a first passenger door that that is moveably attached to the vehicle such:
(A) is adjustable into a first closed condition where the first passenger door is positioned to prevent a person from having access to the passenger compartment from outside the vehicle, wherein the first passenger door has a longitudinal axis that is: (1) substantially parallel to a longitudinal axis of the vehicle; and, (2) substantially parallel to a ground surface;
(B) is adjustable from the first closed condition to a second stored condition where the first passenger door is positioned: (1) at least partially within the storage compartment; and, (2) to provide a person access to the passenger compartment from outside the vehicle, wherein the longitudinal axis of the first door is: (1) substantially perpendicular to the longitudinal axis of the vehicle: and (2) substantially parallel to the ground surface; and,
(C) remains supported to the vehicle as it is moved from the first closed condition to the second stored condition.

12. The vehicle of claim 11 wherein the passenger door is relocated from the first closed condition to the second stored condition by an automated control system.

13. The vehicle of claim 11 wherein the passenger door is relocated from the first closed condition to the second stored condition using force provided by a passenger.

14. The vehicle of claim 11 wherein the first passenger door is supported to the vehicle by a track/track receptor interconnection.

15. The vehicle of claim 11 wherein the first passenger door is pivotal with respect to the passenger compartment into a third open condition, to provide a person access to the passenger compartment from outside the vehicle.

16. The vehicle of claim 11 wherein the first passenger door is adjustable to a third intermediate position between the first closed condition and the second stored condition, wherein the longitudinal axis of the first door is: (1) substantially perpendicular to the longitudinal axis of the vehicle; and (2) substantially perpendicular to the ground surface.

17. The vehicle of claim 11 wherein the storage compartment is longitudinally rearward of the passenger compartment.

18. The vehicle of claim 11 further comprising:
a storage compartment lid supported to the vehicle frame that substantially encloses the storage compartment when the storage compartment lid is in a closed condition.

19. The method of claim 1 wherein step (A) further comprises the step of:
providing a storage compartment lid that substantially encloses the storage compartment when the storage compartment lid is in a closed condition.

* * * * *